United States Patent [19]
Tijen et al.

[11] 3,726,156
[45] Apr. 10, 1973

[54] HUBGEAR FOR A PEDALDRIVEN VEHICLE SUCH AS A BICYCLE

[75] Inventors: Reinder Van Tijen; Hermanus Johannes Van Waveren, both of Dieren, Netherlands

[73] Assignee: N.V. Gazelle Rijwielfabriek V/H Arentsen & Kolling, Dieren, Netherlands

[22] Filed: Aug. 31, 1971

[21] Appl. No.: 176,635

[52] U.S. Cl. ................................74/750 B, 192/6 A
[51] Int. Cl. .........................F61h 3/44, F16d 67/00
[58] Field of Search.........................74/750; 192/6 A

[56] References Cited

UNITED STATES PATENTS

| 3,134,274 | 5/1964 | Schwerdhofer | 74/750 B |
| 3,215,002 | 11/1965 | Schwerdhofer | 74/750 B |

*Primary Examiner*—Arthur T. McKeon
*Attorney*—Allen D. Brufsky

[57] ABSTRACT

A three-speed hubgear for a bicycle of the back pedalling type, comprising a planetary gear with an axially displaceable gear ratio changing member, the position of which is determined by a cylindrical sleeve having a stepped profile at one front edge thus forming a gear ratio selector cam with which a follower of said gear ratio changing member is constantly in contact.

7 Claims, 36 Drawing Figures

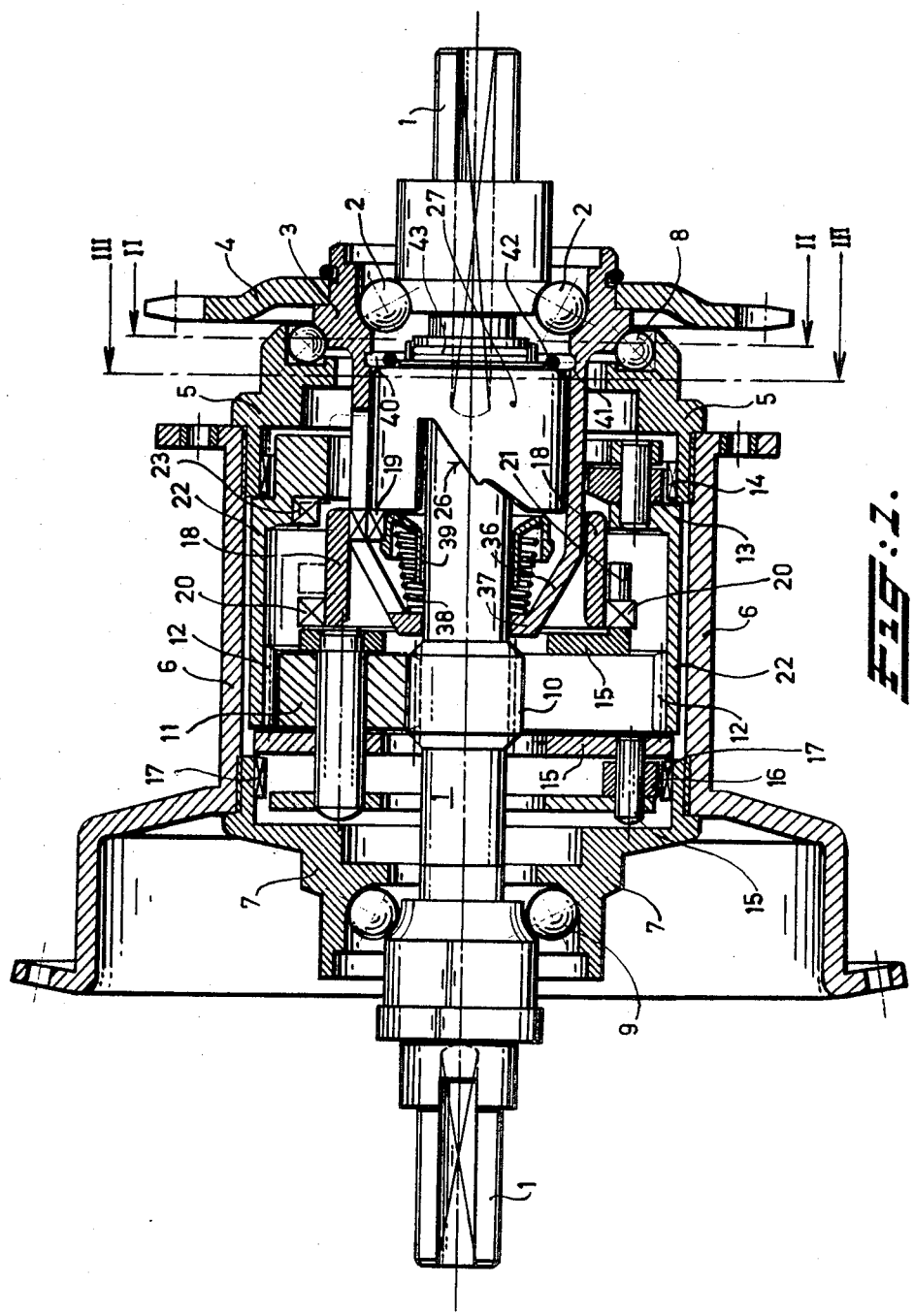

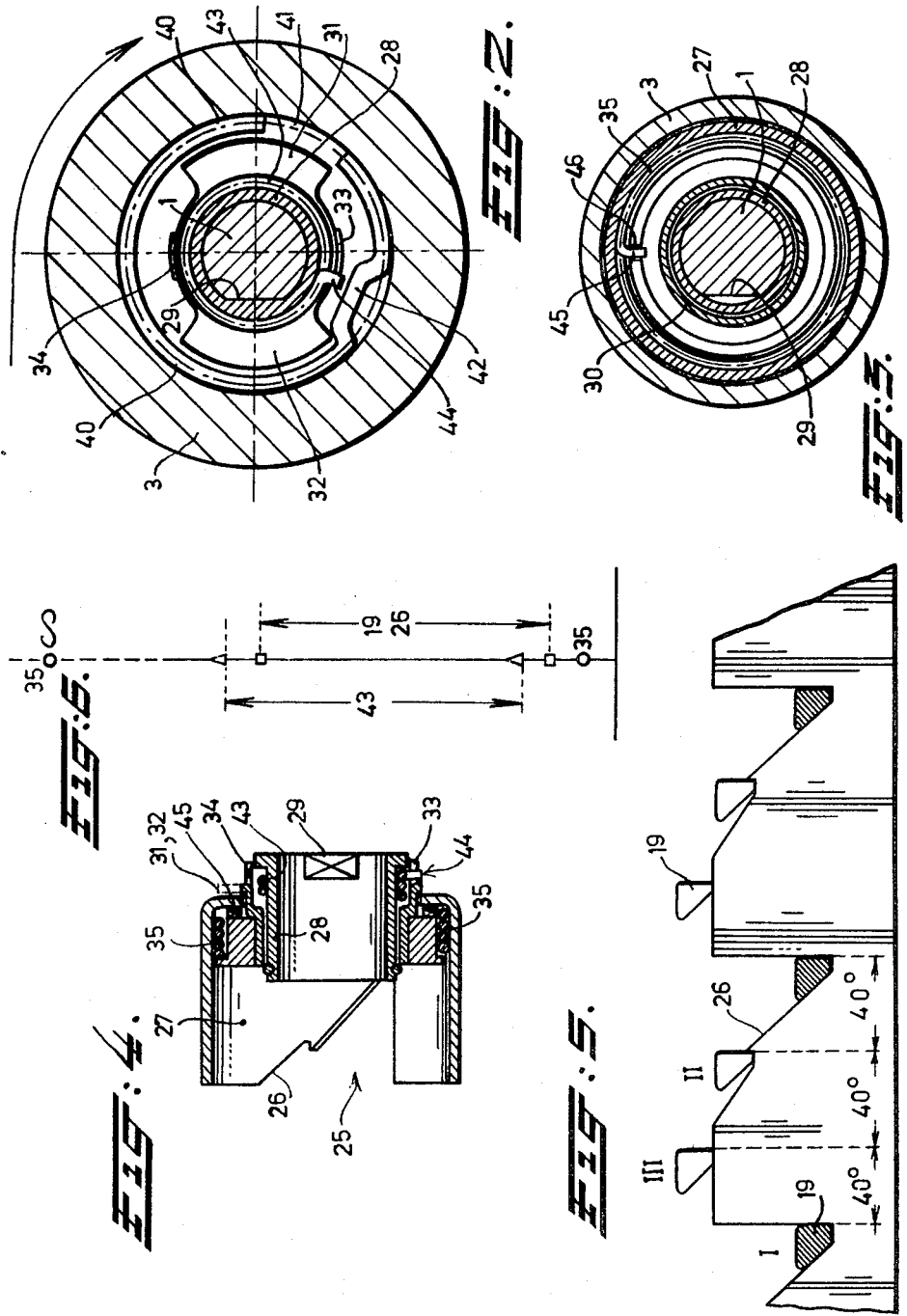

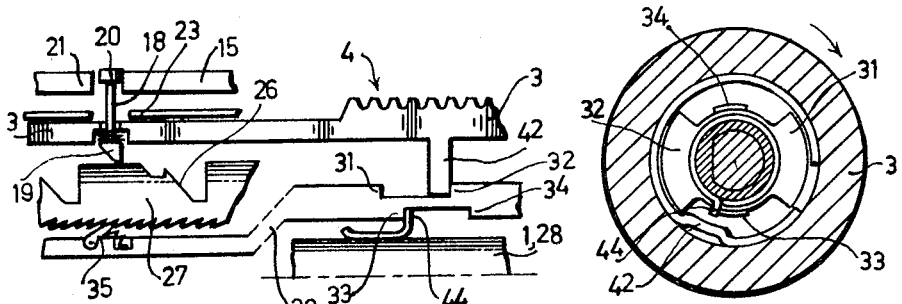
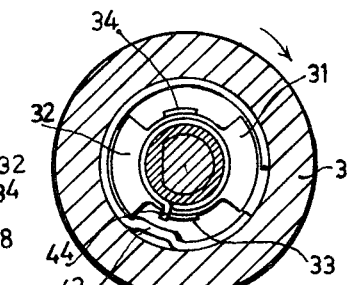
FIG. 7A.  FIG. 7B.
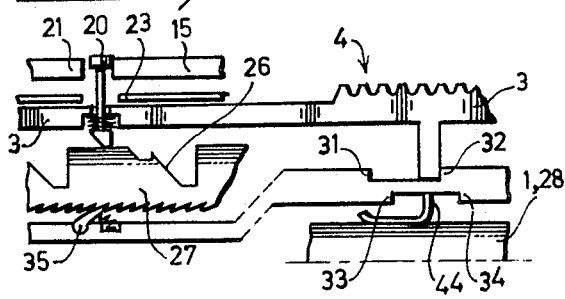
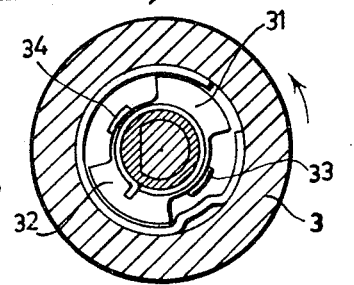
FIG. 8A.  FIG. 8B.
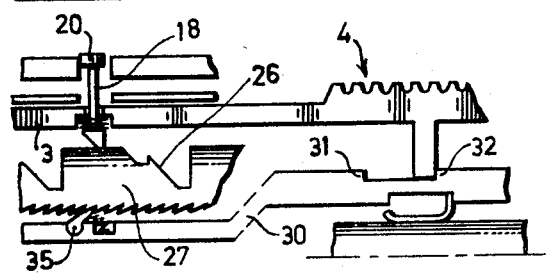
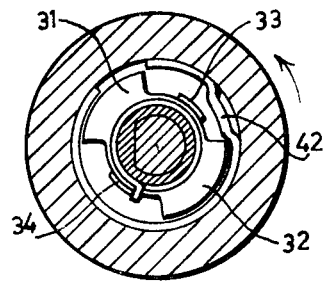
FIG. 9A.  FIG. 9B.
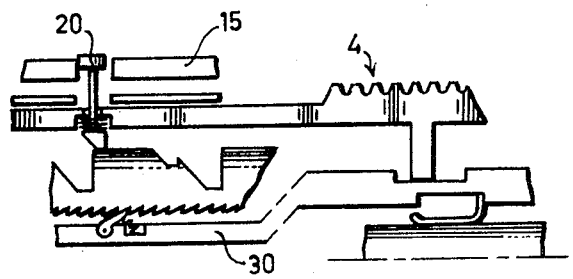
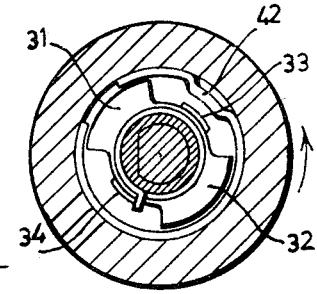
FIG. 10A.  FIG. 10B.

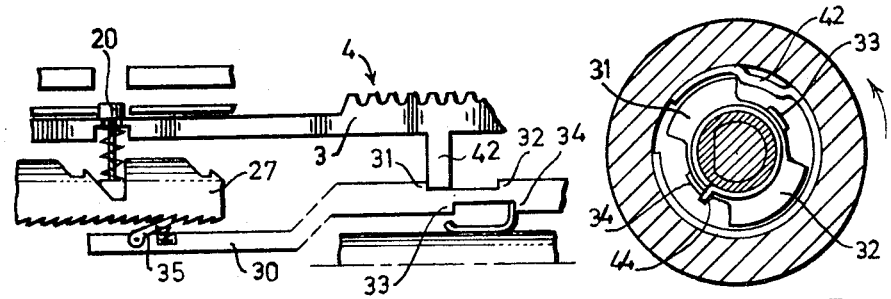
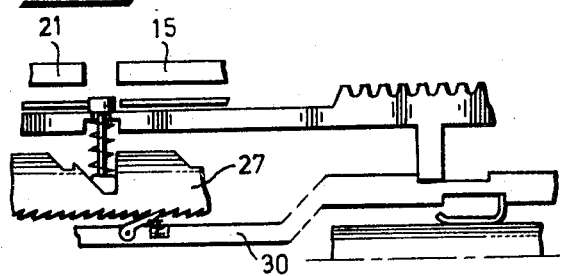 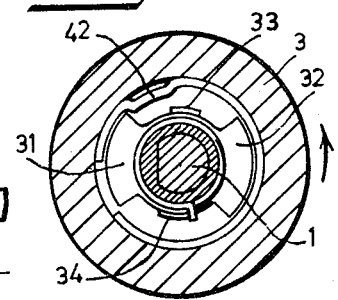
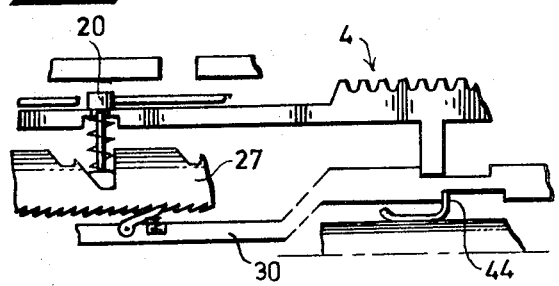 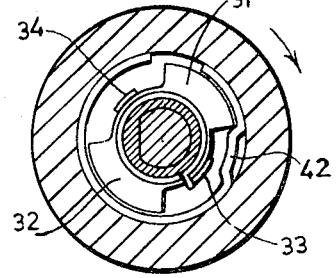
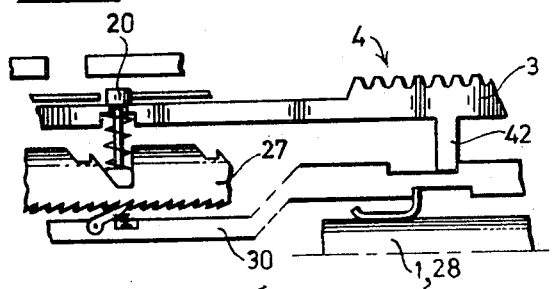 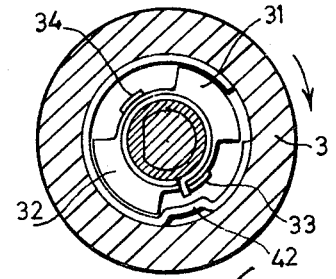

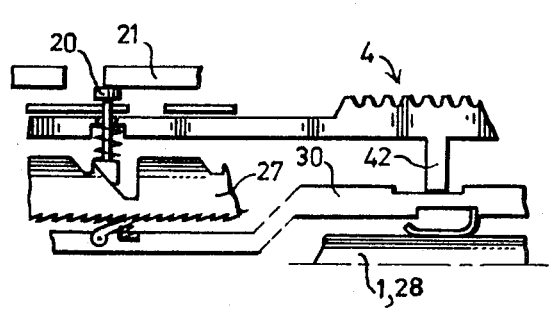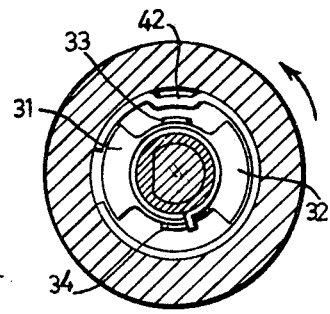
FIG. 15A.    FIG. 15B.
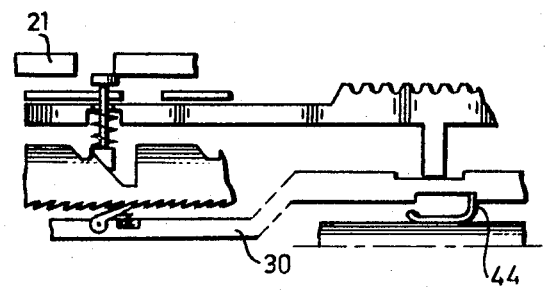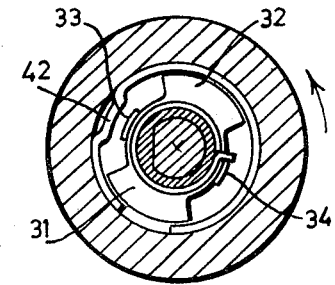
FIG. 16A.    FIG. 16B.
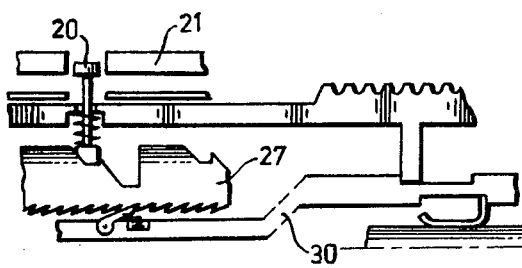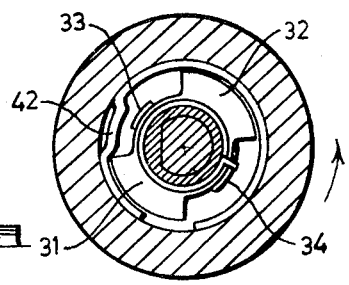
FIG. 17A.    FIG. 17B.
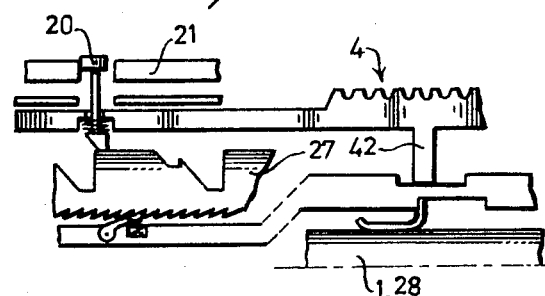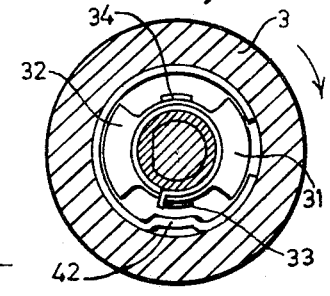
FIG. 18A.    FIG. 18B.

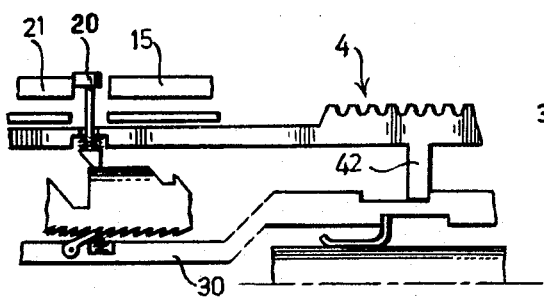 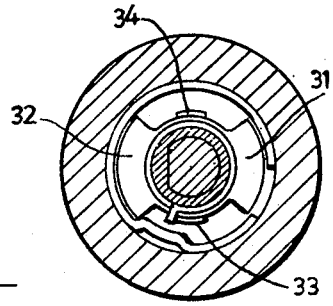
FIG:19A.  FIG:19B.
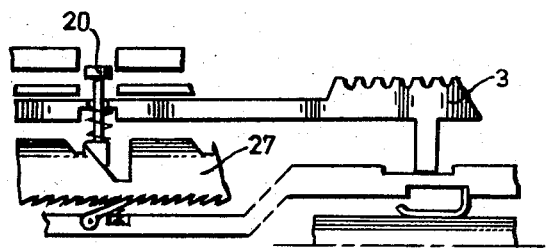 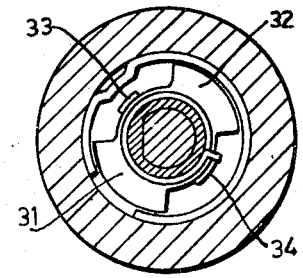
FIG:20A.  FIG:20B.
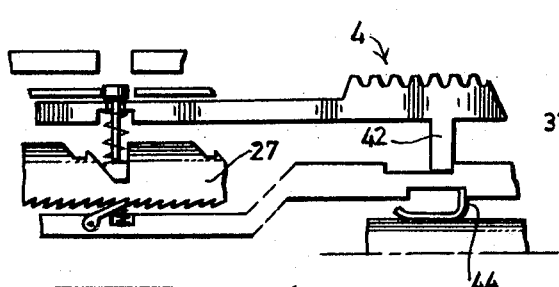 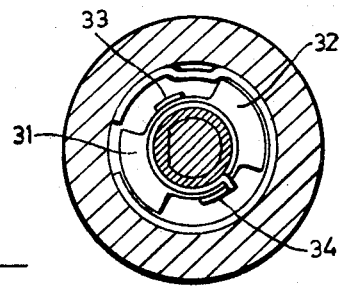
FIG:21A.  FIG:21B.

HUBGEAR FOR A PEDALDRIVEN VEHICLE SUCH AS A BICYCLE

DISCUSSION OF THE PRIOR ART

The present invention relates to a hubgear for a pedal driven vehicle such as a bicycle, which hubgear comprises a fixed central axle, a "sun and planet" gearing including a driving member concentrically arranged with respect to the fixed axle and an axially displaceable carrying member coupled to the driving member in the direction of rotation. This well-known hubgear is provided with a hand-operated change mechanism which is coupled to the hubgear via a Bowden cable. Such a device is vulnerable to damage especially when the bicycle is parked with others; it requires regular maintenance e.g., lubrication of the cable and expert adjustment. The last mentioned requirement is important inasmuch that in the event of a partial gear ratio changing action of the device from one ratio to another, undue strain is imposed on certain components of the hubgear mechanism.

The present invention relates in particular to the provision of a gear ratio change mechanism for the foregoingly described hubgear in which a change of gear ratio is effected by a back (reverse) pedalling action of the rider. Such gear ratio change devices are known per se, but these are subjected to one or more of the following quoted drawbacks:

- To prevent more than one change of gear ratio during a change from one ratio to another, the back pedalling action is inhibited after a single change of gear ratio; this is a hindrance when the rider mounts a bicycle;
- this inhibition can result in the exertion of a temporary increase in the force applied to the hubgear above that which is normally experienced and may result in damage to the hubgear mechanism. To anticipate this problem, a stronger mechanism would be required to cope for the extra strain applied thereto;
- When, after executing a change of gear ratio, the reverse pedalling is not prevented in order to eliminate the two previously described drawbacks, the rider is uncertain as to whether he has changed from one gear ratio to the next or whether he has executed a series of gear ratio changes e.g., from a first to a third ratio, instead of from a first ratio to a second; this possibility can lead to undue wear of the hubgear mechanism especially in the so-called three-speed devices;
- bicycle repair agents are mostly not conversant with the operation and assembly of gear ratio changing devices operated by a back pedalling action. This is in contrast to the generally known hand-operated gear ratio changing devices. Consequently a detailed and cumbersome maintenance manual is required with description detailed in word and illustration.

SUMMARY OF THE INVENTION

The present invention is directed to the provision of a "backpedal" arrangement through which the foregoingly described drawbacks are overcome and in which a number of further advantages are obtained. This object according to the present invention is achieved through the provision of a gear ratio selector cam assembly arranged concentrically with the driving member and having a stepped profile and arranged to rotate in both directions, in accordance with the direction of rotation of the pedals, the carrying member comprising one or more cam followers arranged to engage the stepped profile of the gear ratio selector cam and means operative during a backpedalling action to prevent the gear ratio selector cam from turning through an arc exceeding one of said steps on the said profile thereof.

Through these measures there is obtained a gear ratio change mechanism that reacts to a backpedalling action. After a change of gear ratio, a further backpedalling action is possible without executing a further change in the gear ratio and without undue force being exerted on the mechanism.

To prevent an undesired initiation of a change of gear from one ratio to another through a small angular backpedalling action, the invention further aims at providing means operative during a backpedalling action, over a first arc preceding the arc causing a change of gear ratio, to permit reverse rotation of the gear ratio selector cam assembly (lost motion facility), such that during the said action the gear ratio selector cam is rendered inoperative to perform its function. This lost-motion facility, which can be chosen between arbitrary limits, prevents an undesired and/or accidental change in gear ratio.

The hubgear according to the present invention makes a gear ratio change possible, when the bicycle is stationary e.g., from a high ratio to a low ratio so that a start from stationary is made easy for the rider. Moreover the gear ratio change mechanism cannot rest in a position of partially effected change of gear ratio since by a forward pedalling action the gear ratio change mechanism will first be brought into its initial position.

SURVEY OF THE DRAWINGS

FIG. 1 shows a longitudinal section of the hubgear.

FIGS. 2 and 3 show cross-section of the hubgear on lines II—II and III—III of FIG. 1.

FIG. 4 is an enlarged axial cross-section of the gear ratio selector cam assembly of FIG. 1.

FIG. 5 shows a view of the stepped profile of the gear ratio selector cam.

FIG. 6 depicts graphically the different resistance couples which are essential for the good functioning of the gear ratio change mechanism.

FIGS. 7A, 7B up to and including 21A and 21B show illustrations of different states in the course of change in gear ratio, and in which each illustration comprises adjacently an end view of the gear ratio change selector cam assembly and a schematic development of said assembly.

DESCRIPTION OF A PREFERRED EMBODIMENT

The gear hub assembly comprises a fixed central axle 1 which is supported in the region of its outer extremities in a well-known manner by the rear fork of a bicycle frame (not shown). Supported on the axle 1, via an annulus of balls 2 is a driving member 3. A chain sprocket wheel 4 is affixed to the driving member 3. The hub is composed of a three-section sleeve 5, 6 and 7 such that section 5 is supported by an annulus of balls 8 upon the driving member 3, and such that section 7 is supported on the axle 1 by an annulus of balls 9.

Within the sections 5 – 7 of the sleeve there is accommodated a planetary gear comprising a central "sun" gearwheel 10 integral with the axle 1. Disposed around the "sun" gearwheel 10 are a number of (e.g., four) "planet" gearwheels 11 the teeth of which are in engagement with those of the "sun" gearwheel 10 and also in engagement with the internal teeth of an annulus 12 forming the outer "sun" wheel of the gearing arrangement. The annulus 12 has a sleeve-like extension 22 in which a number of rotatable pawls 13 are accommodated and arranged to cooperate with internal gear teeth 14 of the section 5 of the sleeve. The "planet" gearwheels 11 are supported on a carrier 15 for rotation and which carrier is provided with a number of pawls 16 which are arranged to cooperate with internal gear teeth 17 of the section 7 of the sleeve.

A carrying member 18 operates with the driving member 3 through the sliding engagement of a number of cam followers 19 in axial grooves in the driving member 3. The carrying member 18 is provided with dogs such as 20, which after establishment of the chosen gear ratio, take over the drive to the hubgear. FIG. 1 shows dogs 20 engaged with claws 21 extending from a side of the planet carrier 15. In this condition the hubgear is in the highest of the gear ratio whereby the planet carrier 15 is driven by the sprocket wheel 4, the driving member 3, cam followers 19, the carrying member 18, dogs 20 and the claws 21. The planet wheels 11 roll over the stationary central sun gear wheel 10 and transmit an accelerated drive to the sleeve 12 via the annulus 12, whereby this drive is transmitted via the pawls 13 to the sleeve 5, 6 and 7, the pawls 16 riding over the teeth out of engagement with them. The sleeve-like extension 22 is internally provided with circumferentially disposed claws 23 arranged to engage with the dogs 20 extending from the carrying member 18. In this condition of engagement the hubgear mechanism is in the lowest of the gear ratios, since the annulus 12 is directly coupled to the sprocket wheel 4, the pawls 13 are lifted and the speed reduction is transferred to the planet carrier 15 and via the pawls 16 to the sleeve 5–7.

The gear-change mechanism of the hubgear can be put into an intermediate position, in which the dogs 20 extending from the carrying member 18 may still engage with the claws 21 of the planet carrier, but in which the pawls 13 are lifted (by the carrying member 18). The accelerated driven annulus 12 with its extension 22 now rotates freely and the driving couple is directly transmitted through the planet carrier 15 via the pawls 16 to the sleeve 5–7. In this condition of mechanism a direct drive exists.

The axial displacement of the carrying member 18 is effected in this known hubgear through a hand operated gear ratio selection mechanism. According to the present invention the hand operated selection means is replaced by a mechanism operative through a backpedalling action on the part of the rider and which is now to be described.

As shown in FIG. 1, the driving member 3 is mainly cylindrical in form. Concentric with the driving member 3 is a gear ratio selector cam assembly 25 having a rim portion 26 stepped in profile. The stepped rim portion 26 is arranged to co-act with the cam followers 19 of the carrying member 18. The gear ratio selector cam assembly 25 thus comprises: an outer sleeve or case 27 having the stepped rim profile 26 at its left side as shown in FIG. 1. This profile is shown in developed form in FIG. 5. An inner sleeve or case 28 is concentrically arranged within outer case 27, the inner case being provided with a flat 29 on its inner side to engage with a corresponding flat on the fixed axle 1. Arranged intermediate the inner case 28 and the outer case 27 lies a ringlike member 30 hereinafter referred to as the intermediate ring 30 and comprising two portions (see FIG. 4). The inner portion of the intermediate ring 30 is provided with four projections designated 31 to 34 inclusive and two of which 31 and 32 (see FIG. 2) extend radially and the other two of which 33 and 34 extend axially.

Between the outer case 27 and the intermediate ring 30 there is arranged a freewheel coupling 35 which comprises a so-called coil spring (FIGS. 3 and 4).

The left lying portion 36 of the driving member 3 (FIG. 1) is a truncated cone and the inner periphery 37 acts as a bearing for the driving member on the fixed axle 1. Contained within the truncated portion 36 of the driving member 3 there is a compression spring 38, which via a housing 39 for this spring, exercises an axial thrust on the extended cam followers 19 of the carrying member 18. The housing 39 incorporates a cylindrical portion that can be slid along and turned around the fixed axle 1 on which it is accommodated. The housing 39 further has a collar which exerts an axial force on the cam followers 19 through engagement therewith. On the assembly of the spring 38 with its housing 39, said collar through axial movement with respect to the fixed axle 1 will be able to yield along the cam followers 19 so as to engage the rear of said followers. Enclosure of the spring 38 within the driving member has the advantage that both free ends of the spring engage components 37 and 19 which rotate identically. The spring 38 urges the cam followers 19 permanently against the profile 26 of the sleeve 27. This sleeve 27 rests at its right side (in FIG. 1) against a split retaining ring 40, which is nonrotatably accommodated in an annular groove 41 machined in the inner wall of the driving member 3. A part 42 of the retaining ring 40 is bent radially inward as shown in FIG. 2 to provide a stop with which the projections 31 and 32 of the intermediate ring 30 can engage. It is also possible to have two diametrically opposed stops in place of a single one.

As shown in FIGS. 2 and 4 an annular trailing spring 43 is accommodated on the fixed inner case 28 and is provided with an outwardly bent free end 44 which can be engaged by one or the other of the two projections 33 and 34 extending from the intermediate ring 30. It will later become apparant in this description that the spring 43, through friction, is able to exercise two different torques on the fixed central axle 1 (in fact on the inner case 28 which is accomodated on the axle 1 in fixed engagement therewith) and dependent of the rotational direction of the pedals; FIG. 6 illustrates these torques. On rotation of the driving member 3 in a clockwise direction (see FIG. 2), the projection 33 will engage against the stop 44 formed on the annular spring 43, and only slight friction between this spring and the inner 28 takes place, but however sufficiently great enough to bring the coil spring 35 into the freewheeling condition and to maintain it in this condition as shown in FIG. 6. In the anti-clockwise direction corresponding with a reverse or backpedalling direction, the projection 34 will engage against the stop 44 formed on the annular trailing spring 43 (shown in FIG. 9A), and such that greater friction or torque is encountered and well in excess of the torque required to permit the cam followers 19 to slide along the profile 26 of the gear ratio selector cam assembly 25.

The coil spring 35 forming a free-wheel coupling has a free end 45 (FIG. 3) bent radially inwards and which is accommodated in a recess 46 on the right hand side of the intermediate ring 30. The coil spring 35 is located against the inside of the case 27 and by relative rotation of the intermediate ring 30 on one side and the case 27 on the other side either a trailing with light friction, or a positive coupling between the two will result. In the first instance the friction is less than the minimum torque of the spring 43. In the other instance the friction is greater than the maximum torque of the spring 43 (vide FIG. 6).

The operation of the gear ratio change mechanism is now to be described with reference to FIGS. 7A to 21B. It will be noted that the coil spring or freewheel coupling 35 in FIGS. 7B to 18B is indicated by a pawl in the interests of clarity to show that in one direction the freewheel coupling presents very little friction whilst in the other direction considerably high (nearly infinite) friction is developed. The quoted figures are subdivided into different groups each of which illustrate a specific condition of operation.

FIGS. 7 to 14 show normal gear ratio changing in the hubgear.

FIGS. 15 to 17 show, in combination with FIGS. 9 and 10, the different motions of the gear ratio change mechanism when the axial movement of the carrying member 18 is temporarily inhibited.

FIGS. 18 to 21 with FIGS. 8 and 10 illustrate two examples of a partially executed change of gear ratio, the completion of which has subsequently been interrupted.

FIG. 7 shows the condition during normal forward pedalling action The stop 42 of the retaining ring 40 rests against the projection 32 whilst the projection 33 thrusts against the free end 44 of the annular spring 43. This lastmentioned spring 43 therefor exerts a very slight frictional effect, however above the frictional effect of the previously described freewheeling arrangement 35 (see FIG. 6) so that the entire gear ratio selector cam assembly 25 is able to rotate about the fixed inner case 28 and the axis of the central axle 1 with very little resistance. Accepting the fact that FIG. 7 shows the situation in which normal (forward) pedalling is interrupted, FIG. 8 shows a situation on the commencement of a back (reverse) pedalling action in which the driving member 3 is rotated in a reverse direction over an arc 45°. To this reverse rotation of the driving member 3 not only the retaining ring 40 but also the outer case 27 which is gripped between the cam followers 19 (with the compression spring 38) on one side and the retaining ring 40 on the other side, participates.

The intermediate ring 30 also rotates back with the outer case 27 since there is no mechanically loaded contact between the inner case 28 and the intermediate ring 30. The annular spring 43 remains stationary on the inner case 28. Consequently the projections 31, 32, 33 and 34 are carried back with the driving member 3 (FIG. 8) until projection 34 comes into engagement with the stop 44 formed on the spring 43 (FIG. 9). At this moment the torque of the annular spring 43 upon the inner case 28 and therefor upon the axle 1, increases to a value that is greater than the torque required for sliding the cam followers 19 over the profile 26 of the gear ratio selector cam assembly 25. This means that movement of the projection 34 and thus rotation of the intermediate ring 30 is prevented.

The "ratchet and pawl" type action of coil spring 35 permits a fixed coupling between the intermediate ring 30 and the outer case 27.

Since the torque of the spring 43 tensioned by the extension 34 is greater than the sliding resistance of the cam followers 19 along the profile 26 (see FIG. 6), the gear ratio selector cam assembly 25 consisting of the inner and outer cases 27 and 28, with the intermediate ring 30 will stay stationary. As the driving member 3 will be rotated in a reverse direction and the cam followers 19 will be carried with the driving member 3, said followers will ride along the profile 26 and cause axial movement of the carrying member 18 such that a change in gear ratio is effected. In FIGS. 9 to 11 this change is shown as one from the highest to the lowest of the gear ratios, illustrated in FIG. 5 as a change in gear ratio from III to I. FIG. 6 shows along the ordinate the different levels of the torque exercised by the freewheel coupling 35, the annular spring 43 and the cam followers 19 engaging the profile 26 of the gear ratio selector cam assembly 25.

The first phase of the reverse (back) pedalling action, previously described with reference to FIGS. 7 to 9, constitutes a so-called lost-motion facility, whereby, in spite of the reverse (back) pedalling action no gear ratio change is effected. The arc of this movement is determined by the number of the projections 33, 34 and their dimension in circumferential direction. In the illustrated condition the arc of the lost-motion facility is approximately 120°.

In FIG. 11 there is shown the condition at the termination of a change of gear ratio. The stop 42 has moved in the free space between the projections 31 and 32 so that the stop 42 now comes into engagement with projection 31. This moment in the back (reverse) pedalling action does not have to be noticed by the rider. When there is further back (reverse) pedalling action a condition as shown in FIG. 12 comes into existence. During this action the outer case 27 and the intermediate ring 30 will rotate in a reverse direction together with the driving member 3 acting via the stop 42 and the projection 31, thereby overcoming the frictional resistance of the annular spring 43 along the inner case 28. Thus it is impossible for a further change in gear ratio to be executed since there is only a restricted relative movement between the driving member 3 (with the cam followers 19) on one side and the intermediate ring 30 and the profile 26 on the other side, said movement being ruled by the free space between the stop 42 on one side and projections 31, 32 on the other side. In the embodiment shown, this arc is approximately 40°.

As soon as the rider terminates back (reverse) pedalling and commences to pedal in a forward direction, the projection 34 will move out of the engagement with the free end 44 of the annular spring 43, since there is scarcely any resistance presented to the rotation of the intermediate ring 30 on the stationary inner case 28. Consequently the outer case 27, the intermediate ring 30 and the driving member 3 rotate together whilst the annular spring 43 remains stationary on the inner case 28. After, approximately, 120° rotation of the driving member 3 the condition as shown in FIG. 13 obtains and such that the projection 33 comes into engagement with the end 44 of the spring 43. This closes the end of the first repositioning phase. As the result of the engagement of the projection 33 with the end 44 of the spring 43 a small torque comes into existence to prevent the rotation of the intermediate ring 30 in which the end 45 of the coil spring 35 (freewheel) is gripped.

As a result of this condition the freewheel effect obtains and the driving member 3 together with the outer case 27, and the retaining ring 40 with the stop 42 will rotate relative to the now stationary intermediate ring 30 until finally a condition as shown in FIG. 14 is reached. This implies that the stop 42 is again moved back into engagement with the projections 32 with which it originally cooperated (see FIGS. 2 and 7). This means that the second repositioning phase is completed, the object of which was to shift off the coil spring (the pawl) 35, in relationship to the outer case 27 with the profile 26 to a position in which a further change in gear ratio is made possible. A further rotation of the driving member 3 takes the annular spring 43 as well as the intermediate ring 30 along.

In FIGS. 15 to 17 there is illustrated the condition existing through a temporary misengagement between the dogs 20 and the claws 21 of the planet carrier 15 when changing gear from I to II. FIGS. 15A and 15B illustrate the instant of gear ratio change. As a result, the torque exercised by the annular trailing spring 43 is exceeded and allows the outer case 27 with the intermediate ring 30 and the spring 43 to rotate together with the driving member 3. This common rotation continues until the dogs 20 can engage with the claws 21. At this moment the stop 42 is still in the position which it earlier assumed between the projections 31, 32. The annular spring 43 is now again in a condition to hold the intermediate ring 30 and via the coil spring 35 the outer case 27 with the curve 26 in order to complete the gear changing operation (see FIG. 16). Finally the stop 42 again comes into engagement with the projection 31. Thus the change in gear ratio is completed without interference; this condition is illustrated by II in FIG. 5.

The change of gear ratio from II (the second ratio) to III (the third) cannot be inhibited by the mechanism. By changing the gear ratio from III to I it is possible that the dogs 20 will be forced against the left hand sides of the claws 23 of the extension 22 under the action of the compression spring 38. On a following normal back or forward pedalling action, being exercised by the rider, rotation of the hub members will cause the dogs 20 and claws 23 to come into almost instantaneous engagement under the influence of the spring pressure.

In FIGS. 18 and 19 with FIGS. 8 to 10 an illustration is given of the condition existing when a change in gear ratio from III to I is interrupted. When the rider exercises a forward pedalling action after a partially executed change in the gear ratio, the cam followers 19 will only have moved over a portion of the noninclined portion of the cam profile 26. Nevertheless the operation of the gear ratio change mechanism can not be disturbed. Starting from FIGS. 7, 8 and 9 (lost-motion facility), the FIG. 10 illustrates the condition at the moment when the rider reverses direction of pedalling from back (reverse) pedalling to forward (normal) pedalling. When subsequently the pedalling is continued in forward direction, the lost-motion facility is restored (see FIG. 18) and there is no further movement of the cam followers 19 with respect to the cam profile 26. However the stop 42 rotates back to engage the projection 32 (FIG. 19) and whereby the freewheel coupling 35 slips. The cam followers 19 remain in a position halfway along the noninclined portion of the cam profile 26.

On the first following complete change of gear ratio from III to I, the cam followers 19 are urged to take a position on the profile 26 beyond I. but ahead of II since relative movement of the outer case 27 (constituting the cam profile proper 26) is inhibited and maintained so until the stop 42 has moved from engagement with projection 32 into engagement with projection 31. On the following forward pedalling action the cam followers 19 are returned to the position I under the influence of the spring 38. The order in which the different adjustments during a change in ratio are executed is dependent on whether or not there is a direct engagement of the dogs 20 into the claws 23 and thus the moment when the cam followers 19 are able to slide back over the cam profile 26. Finally the concerned integers of the mechanism return to their normal positions as illustrated in FIG. 14.

Another example of a partially executed change from one gear ratio to another is illustrated in FIGS. 20 and 21. This example is particularly concerned with an attempted change from I to II. Again in this example the mechanism cannot be misaligned, despite the fact that the cam followers 19 have only moved along a portion of the cam profile 26. After initiating a change in gear ratio from position I (FIG. 5) to a place ahead of position II (FIG. 20) the cam followers 19 are urged by a forward pedalling action to move back to position I (FIG. 21) under the influence of the conical coil spring 38. Thereafter follows the reverse rotation of the lost-motion facility. This last described cycle of operation can also be executed in the reverse manner, if the dogs 20 are not yet in a correct relative position with respect to and for engagement with the claws 23.

After initiating a change from position II to some point on the inclination ahead of position III, a subsequent forward pedalling action will move the cam followers 19 (and thus the carrying member 18) under all circumstances, back again to position II under the influence of the conical coil spring 38.

It will be noted that in the shown embodiment the profile of the outer case 27 is divided into three separate sections, each section occupying an arc of 120°. Moreover the cam profile is arranged such that a gear ratio changing can subsequently be executed. in the order: first I (lowest), second II (1 : 1) and third III (highest) and thereafter direct back to the first I (lowest). It is possible to split up the last mentioned step into two steps by adding a possibility to change from position III to position II. The mechanism can clearly be adapted to operator for only two ratios, but also for a hubgear having four ratios.

One of the most important practical features and advantages of the hubgear described herein is that the gear ratio selector cam assembly 25 with other appendant integers can be withdrawn from the fixed axle 1 for replacement, in the event of wear or damage or faulty operation by removal of the retaining ring 40. Through this facility, detailed instructions to the cycle repair agent, with reference to the constructional assembly and the internal arrangement of the gear ratio selector cam assembly 25, have become superfluous.

What is claimed is:

1. A hub gear for a pedal driven vehicle comprising a fixed central axle, sun and planet gearing including a driving member concentrically mounted on the said fixed axle and an axially displaceable carrying member coupled to the driving member in the direction of rotation, further comprising a gear ratio selector cam assembly positioned concentrically with the driving member and having a stepped profile and positioned to rotate in the forward and reverse directions under the action of pedals, the carrying member comprising one or more cam followers arranged to engage the stepped profile of said gear ratio selector cam, and means operative during a back (reverse) pedalling action to prevent the gear ratio selector cam from turning through an arc exceeding one of the said steps on the said profile thereof.

2. A hubgear as claimed in claim 1 in which there are provided further means operative during a reverse (back) pedalling action over a first arc to permit reverse rotation of the gear ratio selector cam assembly (lost-motion) facility) such that during the said action the gear ratio selector cam assembly is rendered inoperative to perform its function.

3. A hubgear as claimed in claim 2 in which the said gear ratio selector cam assembly is enclosed within the said driving member and is confined in axial sense between the said followers on the carrying member and at least one abutment on the inner face of the driving member.

4. A hubgear as claimed in claim 3 in which said gear ratio cam assembly comprises an outer sleeve having a rim portion constituting said stepped profile, an inner sleeve arranged on said fixed central axle and in fixed angular relationship therewith, a ring member mounted between the inner and outer sleeve and provided with four projections, a freewheel coupling intermediate the outer sleeve and the ring member, an annular trailing spring encompassing the said stationary inner sleeve such that two of the said projections on the ring member engage with an extremity of the said trailing spring and such that the remaining two projections engage with the abutment within the driving member.

5. A hubgear as claimed in claim 4 in which the said stop in the driving member is formed by an inwardly bent portion of a spring in the form of a splitring which is accommodated within an annular groove in the driving member in fixed relationship therewith.

6. A hubgear as claimed in claim 5 in which the said driving member is in the form of a truncated hollow cone which tapers away from the said splitring to provide a bearing on the said fixed central axle, and in which the said hollow portion accommodates therein a compression spring exerting a thrust on said cam followers to maintain them in engagement with the stepped cam profile.

7. A hubgear as claimed in claim 6 in which the said compression spring is accommodated in a housing having a cylindrical portion by which it is supported on the said fixed central axle, said housing having a protruding rim urging against the cam followers, said outer rim during assembly snapping into position behind the followers.

* * * * *